Patented Dec. 19, 1933

1,940,109

UNITED STATES PATENT OFFICE 1,940,109

ICE CREAM AND PROCESS OF MAKING THE SAME

Clarence W. Vogt, Louisville, Ky., assignor to Vogt Instant Freezers Incorporated, Louisville, Ky., a corporation of Delaware No Drawing. Application December 16, 1929
Serial No. 414,567

4 Claims. (Cl. 99—16)

This invention relates to the manufacture of ice cream and includes a new composition of matter differing from the ordinary ice cream in certain important particulars and having highly desirable properties or characteristics. It also includes a new process whereby the time required for freezing is reduced and the product itself is greatly improved.

Ice cream as made according to standard practice and the usual formula includes four main constituents, namely, sucrose, butter fat, serum solids and water. The product cannot be sold as ice cream without a certain specified amount of butter fat. The statutory or legal minimum varies in different States and municipalities and in most States it is at least 8% or 10% or more. Sucrose is an essential in order to give the sweetness demanded by the consuming public. The amount of serum solids may vary, but it is highly desirable that this percentage be as high as commercially practical, in order to give body to the ice cream. The lower the percentage of such serum solids, the closer the product approaches water ice or sherbet, and the less marketable it becomes as ice cream. Such serum solids comprise about one-half lactose and the remainder albumen, casine and ash or mineral matter. A small percentage of gelatine may be, and usually is, added. In a fairly standard formula for making ice cream with the maximum serum solids the ingredients are as follows:

|  | Percent |
| --- | --- |
| Sucrose | 15.0 |
| Butter fat | 10.0 |
| Serum solids | 12.0 |
| Gelatine | .5 |
| Water | 62.5 |
|  | 100.0 |

Heretofore it has not been possible to obtain a satisfactory product if the serum solids be increased unless the other solid ingredients be correspondingly reduced, but as above noted the sucrose and butter fat cannot be reduced to any substantial extent. This is because of the relative solubility of said solids in water, particularly in the water remaining unfrozen in ice cream at the temperature at which said ice cream is usually served.

The lactose requires about nine times its mass of water in the formula in order to remain in solution in the frozen product. The sucrose required only approximately one-half its mass of water. In the above formula it will be noted that the lactose amounts to 6% and this therefore requires 54% of water to dissolve and the sucrose requires 7½% making a total of 61½%. It will be noted in the above formula that there is only available 62½%. If the percentage of serum solids in this formula be increased and the percentage of the other solids be kept the same, there must be a decrease in the percentage of water beyond the point where the lactose can remain in solution in the ice cream made according to present day batch process. The serum solids can be increased in this formula only by reducing the butter fats or the sucrose, but as above indicated no reduction in these is permissible to come within the statutory provisions as to butter fat and the consumer's demand as to sweetness.

An increase in the percentage of serum solids has been considered desirable in order to give increased body to the ice cream, but if the amount of serum solids (and therefore of lactose) be increased the lactose will crystallize out during either the final freezing, hardening or storage and the ice cream will have a very sandy texture due to the lactose crystals. This is universally recognized as an undesirable property in ice cream. An increase of 1% of lactose requires an increase of 9% of water which means that the butter fat or the sucrose must be reduced 9%.

Ice cream seldom has over 70% of the total water content frozen during manufacture or storage or at the time of serving. If a larger percentage of the water be frozen, the ice cream becomes so solid and rigid that it cannot be dispensed with the usual utensils and cannot be eaten with comfort. In the usual practice only about 15% of the water is frozen in a batch freezer. This partially frozen product in a plastic state is considerably softer than the ice cream as usually served for consumption. This partially frozen product is then delivered to the hardening rooms where the percentage of frozen water is increased from 15% to approximately 60%, but seldom over 70%. It is not practical to freeze much over 15% of the water in the freezer because otherwise too great difficulty is encountered in discharging the contents from the freezer especially if it has the normal amount of air incorporated therein. Even with 15% of the water frozen, the total percentage of solids including the ice would be increased to over 50%.

Ice cream is not readily salable unless a considerable amount of air be incorporated therein during the freezing operation and this reduces its specific gravity and therefore its fluidity. If no air is incorporated the ice cream is of grainy and soggy texture.

One of the objects of my invention is to permit or secure an increase in the percentage of serum solids without the production of a sandy texture. By my invention I am able to increase the percentage of the serum solids in respect to the percentage of water above what has heretofore been universally considered as the maximum limiting percentage. By reason of such increased percentage of serum solids and by reason of the extremely fine texture and homogenity of the product which I produce, the butter fat may also be reduced to the statutory limit and the product still possess a quality of richness heretofore obtained only by an increase in the butter fat percentage.

An ice cream made in accordance with my invention may have the following formula:

| | Percent |
|---|---|
| Sucrose | 15.5 |
| Butter fat | 8.0 |
| Gelatine | .5 |
| Serum solids | 13.0 |
| Water | 63.0 |
| | 100.0 |

This ice cream would be impossible to make under standard practice without getting a sandy texture because the 6½% of lactose (½ of the serum solids) would require 58½% of water and the sucrose would require 7¾% making a total necessary water content of 66¼% whereas in the above formula the water available to dissolve the sucrose and lactose amounts to only 63%. This ice cream made according to my invention will have a far greater body due to even the small increase of the serum solids; it will have a sweeter taste because of the increase in the sucrose; it will have equal if not greater richness in spite of the reduction in the amount of butter fat and will have a smoother texture than the ordinary ice cream and will not have any sandy texture even after being held in storage for several weeks time.

I have discovered that I can increase the percentage of serum solids by greatly increasing the percentage of water which is frozen during the agitation and by freezing this larger percentage of water at an enormously faster rate during the agitation. As a result of the high speed freezing of the large percentage of water the water crystals will be either comminuted or formed very much smaller than those formed in the usual freezing. The larger mass of very much smaller ice crystals will be so uniformly distributed throughout the mass that the lactose solution is subdivided into very minute masses in the intercrystal spaces and these masses are so small that the lactose does not crystallize out during the further freezing in the hardening room. Furthermore the minute quantities of lactose solution between the ice crystals are so separated and of such small sizes that there is no tendency of the lactose solution to flow or circulate from one space to another. If any lactose crystals start they cannot build up to a size which could be detected or could produce the undesirable sandy texture. As a larger amount of water is frozen during agitation there is less to freeze in the hardening room and less time will be required there.

In freezing a mixture made in accordance with the formula above given, I freeze over 30% of the water instead of only 15% or 20% and accomplish this freezing in less than a minute instead of about 15 minutes as in the ordinary batch freezer. In commercial practice of my invention this over 30% of the water content has been frozen in less than 20 seconds at the temperature of the refrigerant commonly employed in ice cream factories which is about −20° F. It will, of course, be obvious that my improved process does not require an increase in the percentage of serum solids nor any change in the standard formula, but produces a better and smoother product even if the standard formula be employed. It preferably includes air to the extent of at least one-third its volume.

An important feature of the invention is that it permits the serum solids to be increased and the butter fat decreased in a way heretofore impossible if a sandy texture is to be avoided. The increase in the serum solids gives a far more desirable ice cream because the serum solids are tissue and bone building ingredients whereas the butter fat is heat and fat producing.

The product is characterized by a smooth texture even though the percentage of factors and surcrose is greater in respect to the percentage of water than will permit of the complete solution of these ingredients in the final product. It is also characterized by a size and character of water crystal which is produced by a freezing of at least 30% of the water in less than one minute of time. It is well known that the slower the rate of freezing the larger the ice crystals. The larger these crystals the larger the inter-crystal spaces containing the lactose and sucrose solution and in which the crystals of lactose may form and build up during the hardening. The exact measurement of my ice crystals is difficult to accurately determine, but is less than fifty microns as a maximum over all dimension.

The product is also characterized by a hardness which is very materially greater than that which results when an ordinary batch freezer of factory size is employed. As the ice cream is harder when it leaves the freezer due to the larger amount of water which has been frozen the ice cream will reach a final desired hardness in the hardening room in a very much shorter time and after any given time it will be harder than the corresponding product made by a batch freezer.

Tests which have been made show that my ice cream is as hard after ten hours in the hardening room as the ordinary ice cream is at the end of twenty-four hours, the hardening room being at a temperature of −10° F. and in standard five gallon cans. On a hardness tester my improved ice cream at the middle of the can registered a resistance of twenty pounds to the square inch whereas the ordinary ice cream registered five. After twenty-four hours my ice cream registered forty-five pounds to the square inch resistance as against thirty pounds for the ordinary ice cream. After one hundred and twenty hours my ice cream registered a resistance of sixty-five pounds to the square inch whereas the ordinary ice cream registered fifty-five.

A further advantage of my improved ice cream is that due to the extremely small ice crystals the ice cream may be permitted to become soft and thereafter hardened without modifying in any way its smooth texture, whereas ordinary ice cream if permitted to soften will become of a sandy texture upon rehardening, particularly if there be a high percentage of serum solids.

If the product is not to be sold as ice cream but as sherbet and therefore may have its butter fat content reduced, the serum solids may run as high as 14%. In theory this would require 63% of water. If there be 20% of sucrose this would require 10% of water, making a total theoretical water content of 73% for the solids which alone amount to 34%. Even assuming that no butter fat, gelatin, or other solid be used, such a product has heretofore been commercially impossible because of the crystallization of the sucrose during the hardening.

Although my improved process may be carried out in various different forms of apparatus and although the product may be made by the use of different apparatus, I prefer to use apparatus of the type disclosed in my Patent 1,783,864, issued Dec. 2, 1930, in which the material is continuously delivered lengthwise through an externally cooled conduit, the length of the conduit being such in respect to the rate of flow that the mix requires not over 30 seconds to pass from one end to the other. Within the conduit is an agitating member which has its shaft or body portion of such diameter in respect to the diameter of the conduit that the passage in which the freezing occurs is of comparatively thin annular space and the entire body of the mix may have at least 30% of the water frozen during its flow through the passage at the rate above referred to and while having whipped into it air which is delivered to the conduit with the mix.

The various percentages hereinbefore set forth are percentages by weight rather than by volume, except in the case of air. In defining the percentage of water present in the ice cream, the water is considered as including water both in the frozen and in the unfrozen state.

Having thus described my invention, what I claim as new and desire to secure by Letters Patent is:

1. In the process of making ice cream the steps which include agitating a layer of aerated mix in contact with a heat transfer surface, and withdrawing heat through said surface at such a rate that over 30% of the water content of the mix is frozen in less than one minute whereby the volume and size of the ice crystals are such that the intercrystal spaces are of a magnitude that does not permit the forming of detectable crystals from the solids in solution in said intercrystal spaces during the hardening and storage.

2. The process of making ice cream which includes delivering the mix into contact with a heat transfer surface, and withdrawing heat through said surface at such a rate that over 30% of the water content of the mix is frozen in less than one minute whereby the size of the intercrystal spaces are of a magnitude that does not permit the forming from the solids in solution in said intercrystal spaces, during hardening and storage, of solid bodies of a size which can be detected by the tongue.

3. The process of making ice cream which includes whipping air into the mix and simultaneously freezing the mix by extracting heat through a heat transfer surface in contact with the mix at such a rate and to such an extent that over 30% of the water content is frozen during said agitation whereby intercrystal spaces are of a magnitude that does not permit the forming from the solids in solution in said intercrystal spaces, during hardening and storage, of solid bodies of a size which can be detected by the tongue.

4. An ice cream part'ally frozen and adapted to be hardened and containing air to at least one-third its volume and having over 30% of the water frozen into crystals of such size that the intercrystal spaces do not contain a sufficient volume of solution of solids as will permit the forming, during commercial hardening, of crystals of said solids of a size detectable by the tongue during the eating of the ice cream.

CLARENCE W. VOGT.

CERTIFICATE OF CORRECTION.

Patent No. 1,940,109.　　　　　　　　　　　　　　December 19, 1933.

CLARENCE W. VOGT.

It is hereby certified that error appears in the printed specification of the above numbered patent requiring correction as follows: Page 2, line 100, for "factors" read lactose; and line 101, for "surcrose" read sucrose; and that the said Letters Patent should be read with these corrections therein that the same may conform to the record of the case in the Patent Office.

Signed and sealed this 20th day of February, A. D. 1934.

F. M. Hopkins (Seal)　　　　　　　　　　　　　　　　　Acting Commissioner of Patents.

if there be a high percentage of serum solids.

If the product is not to be sold as ice cream but as sherbet and therefore may have its butter fat content reduced, the serum solids may run as high as 14%. In theory this would require 63% of water. If there be 20% of sucrose this would require 10% of water, making a total theoretical water content of 73% for the solids which alone amount to 34%. Even assuming that no butter fat, gelatin, or other solid be used, such a product has heretofore been commercially impossible because of the crystallization of the sucrose during the hardening.

Although my improved process may be carried out in various different forms of apparatus and although the product may be made by the use of different apparatus, I prefer to use apparatus of the type disclosed in my Patent 1,783,864, issued Dec. 2, 1930, in which the material is continuously delivered lengthwise through an externally cooled conduit, the length of the conduit being such in respect to the rate of flow that the mix requires not over 30 seconds to pass from one end to the other. Within the conduit is an agitating member which has its shaft or body portion of such diameter in respect to the diameter of the conduit that the passage in which the freezing occurs is of comparatively thin annular space and the entire body of the mix may have at least 30% of the water frozen during its flow through the passage at the rate above referred to and while having whipped into it air which is delivered to the conduit with the mix.

The various percentages hereinbefore set forth are percentages by weight rather than by volume, except in the case of air. In defining the percentage of water present in the ice cream, the water is considered as including water both in the frozen and in the unfrozen state.

Having thus described my invention, what I claim as new and desire to secure by Letters Patent is:

1. In the process of making ice cream the steps which include agitating a layer of aerated mix in contact with a heat transfer surface, and withdrawing heat through said surface at such a rate that over 30% of the water content of the mix is frozen in less than one minute whereby the volume and size of the ice crystals are such that the intercrystal spaces are of a magnitude that does not permit the forming of detectable crystals from the solids in solution in said intercrystal spaces during the hardening and storage.

2. The process of making ice cream which includes delivering the mix into contact with a heat transfer surface, and withdrawing heat through said surface at such a rate that over 30% of the water content of the mix is frozen in less than one minute whereby the size of the intercrystal spaces are of a magnitude that does not permit the forming from the solids in solution in said intercrystal spaces, during hardening and storage, of solid bodies of a size which can be detected by the tongue.

3. The process of making ice cream which includes whipping air into the mix and simultaneously freezing the mix by extracting heat through a heat transfer surface in contact with the mix at such a rate and to such an extent that over 30% of the water content is frozen during said agitation whereby intercrystal spaces are of a magnitude that does not permit the forming from the solids in solution in said intercrystal spaces, during hardening and storage, of solid bodies of a size which can be detected by the tongue.

4. An ice cream part'ally frozen and adapted to be hardened and containing air to at least one-third its volume and having over 30% of the water frozen into crystals of such size that the intercrystal spaces do not contain a sufficient volume of solution of solids as will permit the forming, during commercial hardening, of crystals of said solids of a size detectable by the tongue during the eating of the ice cream.

CLARENCE W. VOGT.

CERTIFICATE OF CORRECTION.

Patent No. 1,940,109.            December 19, 1933.

CLARENCE W. VOGT.

It is hereby certified that error appears in the printed specification of the above numbered patent requiring correction as follows: Page 2, line 100, for "factors" read lactose; and line 101, for "surcrose" read sucrose; and that the said Letters Patent should be read with these corrections therein that the same may conform to the record of the case in the Patent Office.

Signed and sealed this 20th day of February, A. D. 1934.

F. M. Hopkins (Seal)            Acting Commissioner of Patents.